United States Patent
Spector

(10) Patent No.: US 10,536,496 B2
(45) Date of Patent: *Jan. 14, 2020

(54) THEMED ORNAMENTS WITH INTERNET RADIO RECEIVER

(71) Applicant: Donald Spector, New York, NY (US)

(72) Inventor: Donald Spector, New York, NY (US)

(*) Notice: Subject to any disclaimer, the term of this patent is extended or adjusted under 35 U.S.C. 154(b) by 134 days.

This patent is subject to a terminal disclaimer.

(21) Appl. No.: 15/787,813

(22) Filed: Oct. 19, 2017

(65) Prior Publication Data

US 2018/0041558 A1 Feb. 8, 2018

Related U.S. Application Data

(63) Continuation-in-part of application No. 15/581,209, filed on Apr. 28, 2017, now Pat. No. 9,936,316, which is a continuation-in-part of application No. 15/401,773, filed on Jan. 9, 2017, now Pat. No. 9,693,140, which is a continuation of application No. 15/161,658, filed on May 23, 2016, now Pat. No. 9,584,913, which is a continuation-in-part of application No. 14/710,707, filed on May 13, 2015, now Pat. No. 9,367,285, which is a continuation-in-part of application No. 13/856,795, filed on Apr. 4, 2013, now Pat. No. 9,060,040, which is a continuation-in-part of application No. 13/331,469, filed on Dec. 20, 2011, now Pat. No. 8,467,722, which is a continuation-in-part of
(Continued)

(51) Int. Cl.
*H04R 3/12* (2006.01)
*H04L 29/06* (2006.01)
*H04L 29/08* (2006.01)
*H04H 60/65* (2008.01)
*G06F 16/00* (2019.01)

(52) U.S. Cl.
CPC ......... *H04L 65/4084* (2013.01); *H04H 60/65* (2013.01); *H04L 65/403* (2013.01); *H04L 67/02* (2013.01); *G06F 16/00* (2019.01); *H04H 2201/40* (2013.01)

(58) Field of Classification Search
CPC . H04L 65/4084; H04L 65/403; H04L 67/403; H04L 67/04; H04L 65/605; H04L 67/02; H04H 60/47; H04H 60/65; H04H 20/82; H04H 2201/40; H04R 27/00; H04R 2227/003; H04R 2420/07; H04R 2499/15; G06F 16/00
USPC .............................. 455/3.06, 556.1; 345/419
See application file for complete search history.

(56) References Cited

U.S. PATENT DOCUMENTS 6,389,463 B2 5/2002 Bolas
7,003,515 B1 2/2006 Glaser et al.
(Continued)

*Primary Examiner* — Sonny Trinh
(74) *Attorney, Agent, or Firm* — Collard & Roe, P.C.

(57) ABSTRACT

Apparatuses for playing signals received from the internet or other information highway or a stored database on one or more speakers are described. The apparatus has a receiver for receiving information from preselected addresses; a processor for interpreting the signals; and at least one speaker for playing signals from the internet. There is at least one display device in the form of a holographic projector connected to the receiver for displaying a 3D holographic image received from the internet. The processor selects images that correspond with the signals played by the speaker.

4 Claims, 5 Drawing Sheets

Related U.S. Application Data application No. 12/180,901, filed on Jul. 28, 2008, now Pat. No. 8,099,039.

(60) Provisional application No. 60/954,879, filed on Aug. 9, 2007.

(56) References Cited

U.S. PATENT DOCUMENTS

| | | |
|---|---|---|
| 7,058,356 B2 | 6/2006 | Slotznick |
| 7,059,728 B2 | 6/2006 | Alasaarela et al. |
| 7,065,342 B1 | 6/2006 | Rolf |
| 7,738,151 B2 | 6/2010 | Garner et al. |
| 7,817,591 B2 | 10/2010 | Cooley |
| 7,873,040 B2 | 1/2011 | Karlsgodt |
| 8,260,230 B2 * | 9/2012 | Zigler .................. H04H 20/22 455/179.1 |
| 8,467,722 B2 | 6/2013 | Spector |
| 8,472,866 B1 | 6/2013 | Spector |
| 8,543,095 B2 | 9/2013 | Brown et al. |
| 8,725,065 B2 | 5/2014 | Spector |
| 9,060,040 B2 | 6/2015 | Spector |
| 2004/0046783 A1 | 3/2004 | Montebovi |
| 2004/0198175 A1 | 10/2004 | Shively et al. |
| 2006/0168097 A1 | 7/2006 | Pittelli |
| 2008/0086687 A1 | 4/2008 | Sakai et al. |
| 2008/0194175 A1 | 8/2008 | Last et al. |
| 2010/0042920 A1 | 2/2010 | Sigal |
| 2012/0019883 A1 * | 1/2012 | Chae .................. G03H 1/02 359/11 |
| 2014/0342660 A1 | 11/2014 | Fullam |
| 2015/0142536 A1 | 5/2015 | Marlow et al. |
| 2015/0256564 A1 | 9/2015 | Reynolds |

* cited by examiner

THEMED ORNAMENTS WITH INTERNET RADIO RECEIVER

This application is a continuation in part of U.S. patent application Ser. No. 15/581,209, filed on Apr. 28, 2017, which is a continuation in part of U.S. patent application Ser. No. 15/401,773, filed on Jan. 9, 2017 (now U.S. Pat. No. 9,693,140 issued Jun. 27, 2017), which is a continuation under 35 USC § 120 of U.S. patent application Ser. No. 15/161,658, filed on May 23, 2016 (now U.S. Pat. No. 9,584,913 issued Feb. 28, 2017), which is a continuation-in-part of U.S. patent application Ser. No. 14/710,707, filed on May 13, 2015 (now U.S. Pat. No. 9,367,285 issued Jun. 14, 2016), which is a continuation-in-part of U.S. patent application Ser. No. 13/856,795, filed on Apr. 4, 2013 (now U.S. Pat. No. 9,060,040 issued Jun. 16, 2015), which is a continuation in part of U.S. patent application Ser. No. 13/331,469 filed on Dec. 20, 2011 (now U.S. Pat. No. 8,467,722 issued Jun. 18, 2013), which is a continuation-in-part of U.S. patent application Ser. No. 12/180,901 filed Jul. 28, 2008 (now U.S. Pat. No. 8,099,039 issued Jan. 17, 2012), which claims the benefit of priority under 35 U.S.C. § 119(e) to U.S. Provisional Patent Application Ser. No. 60/954,879, filed Aug. 9, 2007, the entirety of all of which is hereby incorporated by reference.

BACKGROUND OF THE INVENTION

This application relates to the field of internet receivers that are capable of receiving Internet radio signals or audio signals from a stored playlist. More specifically, this application relates to speakers and video screens that relate to a specific station that is received through these devices by Bluetooth, Wi-Fi or Wi-Max. It is also noted that one Bluetooth, Wi-Fi or Wi-Max Internet receiver may be used to supply signals to multiple speakers and screens.

Internet Radio Stations are easy to broadcast and with Wi-Fi and Wi-Max can be transmitted to virtually every part of the world. In fact, the problem is that so many stations are available on the Internet that it is hard for them to get traction. It is hard for those stations to get traffic even when they have been "selected" by the service. Therefore, there is a need in the art for an Internet Radio player which can help an Internet Radio Station gain market share.

SUMMARY OF THE INVENTION

The present invention relates to Internet Radio receivers that area wirelessly connected to speakers and screens that are programmed to have a pre-set theme. The theme may be of any number of topics, such as sports, holidays, a particular movie or character, or a culture. Thus, music and programming appropriate to the theme is played through the speaker automatically, while a visual feature, such as a hologram or video display is focused onto or emanating from the speaker, so that the speaker takes on a visual theme of the programming. The speaker is configured with an amplifier and a microprocessor that causes the receiver to send signals from only a pre-set number of thematically appropriate stations or playlists that are saved in a database or streamed from the internet to the receiver. The microprocessor is connected with a holographic projector or other type of projector, and along with the playlist or station, causes the projector to project an image that coordinates with the playlist being played. The image can be projected onto the speaker, or can be projected from the speaker so that the speaker takes on the appearance of the image.

The receiver has a processor that connects to an address on the internet or other information highway or to a stored playlist on a computer. The receiver is wirelessly connected to the speakers or video screens via either Wifi, or BLUETOOTH® technology. Any connection to the internet, however, can be used. The internet receiver can be incorporated into a mobile telephone. The receiver also incorporates a transmitter to transmit the internet signals to the various speakers, with a different internet signal being transmitted to each speaker or screen.

The receiver has a processor that connects to one of a plurality of preselected addresses on the internet or other information highway or to a stored playlist. The apparatus also has an interface for selecting the one of the plurality of preselected addresses. The preselected addresses are related to different themes that correlate with the different visual displays. For example, on a mobile telephone with internet capability, the mobile telephone could have a plurality of applications that relate to internet radio stations installed on it. Selecting one of the applications causes the mobile telephone to communicate with the speaker that corresponds to the theme of the radio station or internet site and cause that speaker to play the content of the selected site. In a preferred embodiment, the applications on the mobile telephone can be changed at will, so that the user is not constrained to a static number of presets. These applications can be loaded on to the mobile telephone from the internet, and can play both the audio and visual content.

Selecting the particular theme also activates the display to correlate with the audio being played. The appearance is configured via a display screen, a projection or holographic displays emanating from the speaker or toward the speaker. For example, the speaker could also comprise a holographic projector that projects 2D or 3D images or videos onto an area or onto the speaker. These images or videos are correlated with the theme selected and the audio being played.

DETAILED DESCRIPTION

As used in this specification and the appended claims, the singular forms "a", "an" and "the" include plural referents unless the context clearly indicates otherwise. Thus, for example, reference to "a radio" includes a combination of two or more radios, and the like.

As used in this specification and the appended claims, "internet" refers not only to the internet, but also to any wide area network or local area network. Use of the term "internet" is not intended to limit the present invention to communications received via the world wide web.

As used in this specification and the appended claims, "pre-selected" means that the internet radio address, or URL, has been programmed into the radio. The pre-selected address may be a default address, or a selection of addresses to which the user can set the radio to default. The addresses can be changed by the user by installing applications for other addresses on the user's smartphone.

As used in this specification and the appended claims, a "speaker" means any sound emitting device and is not limited to standard electromechanical transducer type speakers. Non-limiting examples of suitable speakers are piezoelectric speakers, electrostatic speakers, flat panel speakers and digital speakers.

As used in the specification and the appended claims, a "smartphone" is a mobile telephone equipped with internet capability.

As used in the specification and the appended claims, an "application" or "app" is a software program installed on a smartphone, which can perform certain functions directly or is used to directly connect the smartphone to an internet-based program via a link on the display screen of the smartphone.

Figure 1:
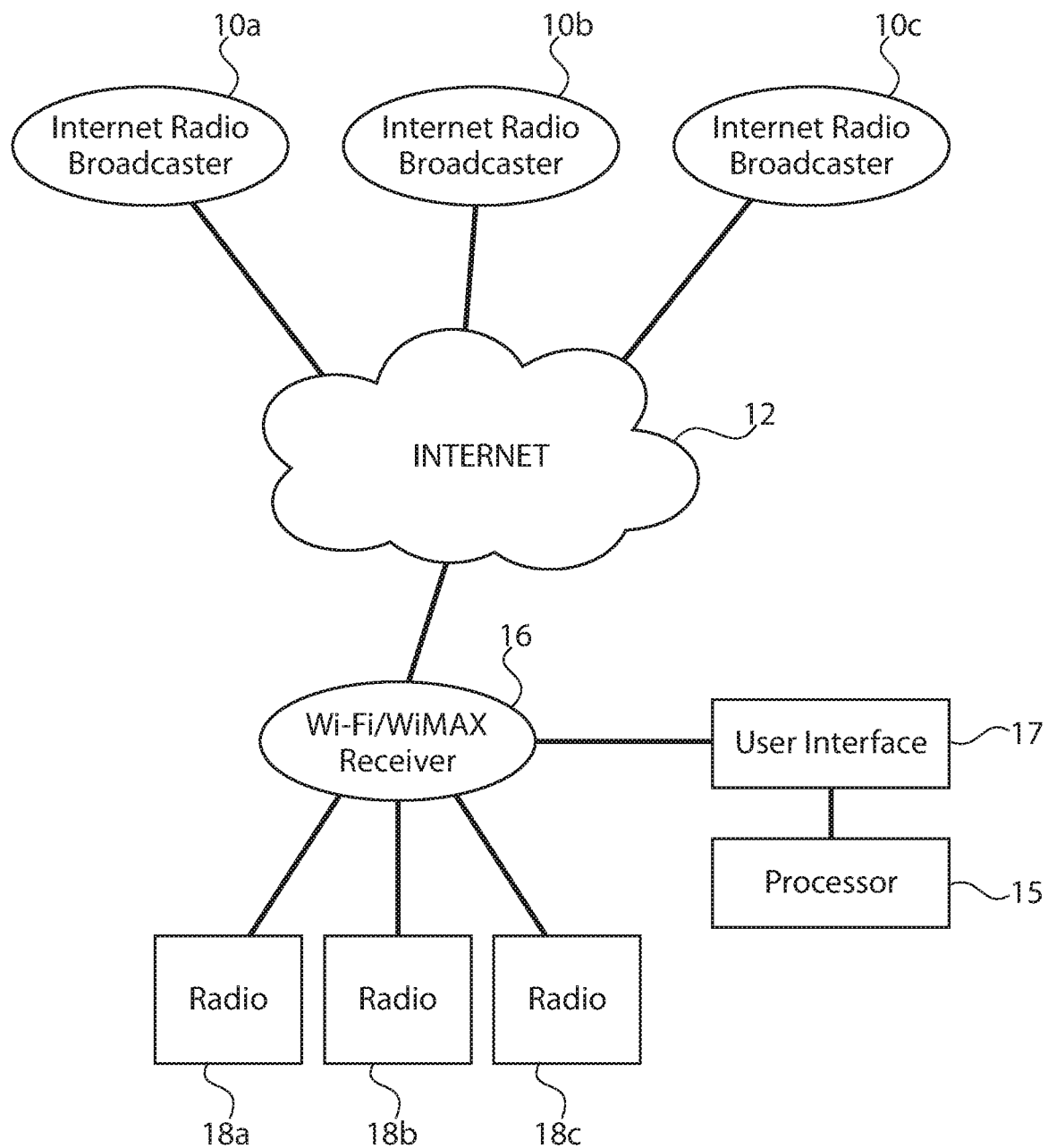
FIG. 1 illustrates a block diagram of an Internet Radio broadcast receiving station.

Referring to FIG. 1, one or more Internet Radio Broadcasters 10a, 10b and 10c, provide electronic signals through the internet 12. The signals can be received by a combination Wi-Fi/Wi-Max receiver/radio 16 and played by multiple speakers 18a, 18b and 18c. The receiver 16 has a processor 15 and a user interface 17 for controlling the preselected stations, as well as volume from each of the speakers. The processor assigns each one of internet radio stations 10a, 10b, 10c to one of speakers 18a, 18b, 18c so that each speaker plays a different radio station. The receiver 16 is wirelessly connected to the internet or other information highway. In a preferred embodiment, the receiver/processor/interface are embodied in a smartphone 60, shown in FIG. 2.

The receiver 16 connects to the internet or other information highway and the processor 15 directs the receiver to a preselected address on the internet or other information highway. Each of the speakers 18a, 18b, 18c displays an ornamental design related to the topic of the signals received from the preselected address on the internet or other information highway. Each speaker 18a-18c plays a different channel and the ornamental design matches the theme of the signals being played.

Detailed embodiments of the invention have a processor 15 that connects to a plurality of preselected addresses on the internet or other information highway. The apparatus also has an interface 17 allowing the user to control various aspects of each of the speakers such as volume and channel selection within the theme of the speaker.

The ornamental design of some embodiments may be selected from the group consisting of: holiday themes, garden themes, spa themes, patriotic themes, sports, etc. The ornamental design of the speaker may be a representation of an edifice, a character, a piece of art or other similar representation. The apparatus defaults to an internet radio station which is correlated with the ornamental design when power is supplied to the speaker.

Figure 2:
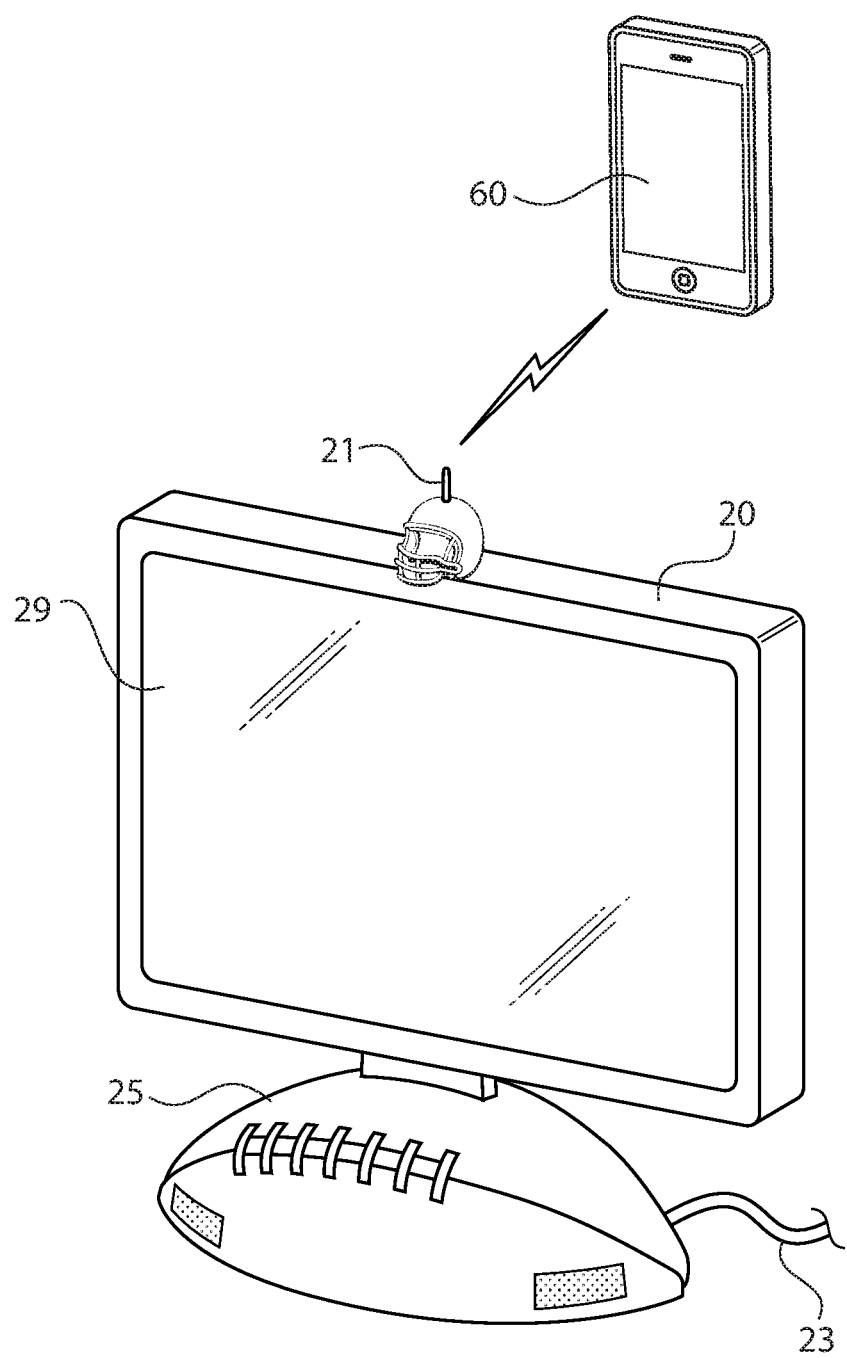
FIG. 2 shows an embodiment where a smartphone communicates wirelessly with a speaker and video screen to play the selected programming.

FIG. 2 shows a speaker 20 according to one or more embodiments of the invention. The speaker 20 shown has an ornamental design related to football. The user can supply power to the speaker by either connection of a power cord 23 to a standard power outlet or by battery power (not shown). Any buttons and dials on the speaker can be shaped in accordance with the ornamental design. For example, the user may power the speaker 20 by pressing a power button 25, shown as a football-shaped button.

The speaker 20 is programmed with a specific internet radio station controlled by the processor 15 in smartphone 60. This radio station will act as a default station related to the ornamental design. Here, the speaker 20 may tune to an internet radio station associated with the National Football League, or a station that broadcast college football games. The user may be able program smartphone 60 to add additional internet radio stations via an application that can be downloaded to smartphone 60.

Once powered, speaker 20 is designed to broadcast the default internet radio station or playlist. The mobile phone 60 communicates via WiFi or other method to speaker 20 or via a wired connection 23 using, for example, an Ethernet connection to a computer or an internet appliance, USB, IEEE-1394, serial, parallel, or any other suitable connection.

Figure 5:
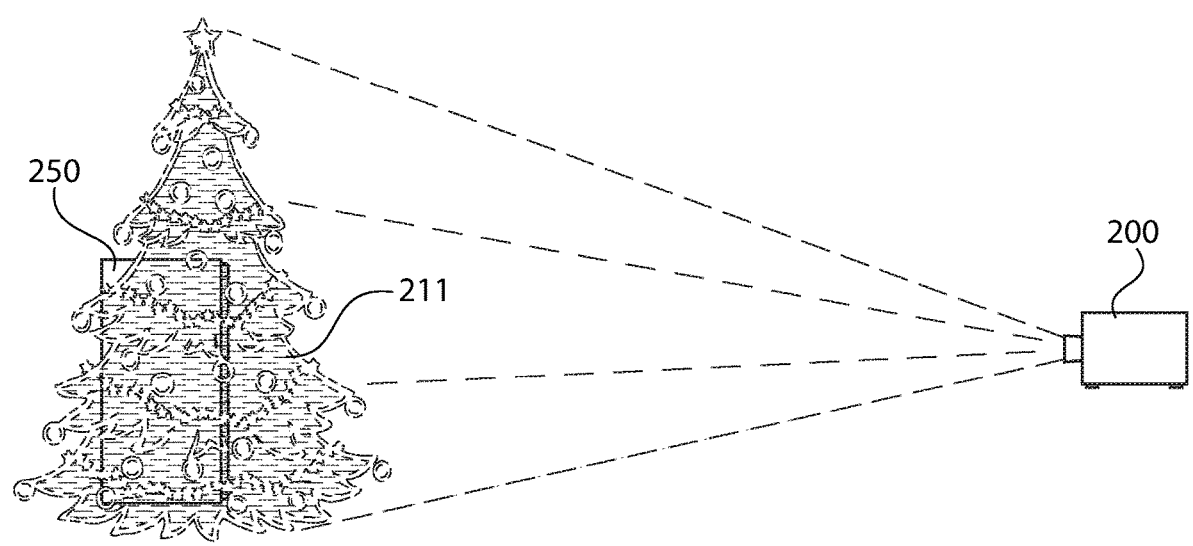
FIG. 5 shows the holographic projector projecting an image onto the speaker.

The speaker 20 can also have a screen 29 which can display information related to the theme of the internet radio station that is being broadcast. For example, the screen 29 can display a football themed graphic, a picture of a prominent player or any other graphic that is related to the content of the station being played. Screen 29 can be placed on a speaker 20 even without extra ornamentation, so that the display 24 is the only ornamentation to indicate the theme of the speaker. The ornamentation displayed by screen 24 is transmitted to speaker 20 from smartphone 60. The software application installed in smartphone 60 connects to a database with graphics that match the topic being transmitted, and transmits these graphics to the screen 24. The display could also be one that is projected from the speaker or as a hologram, as shown in FIG. 5.

Figure 4:
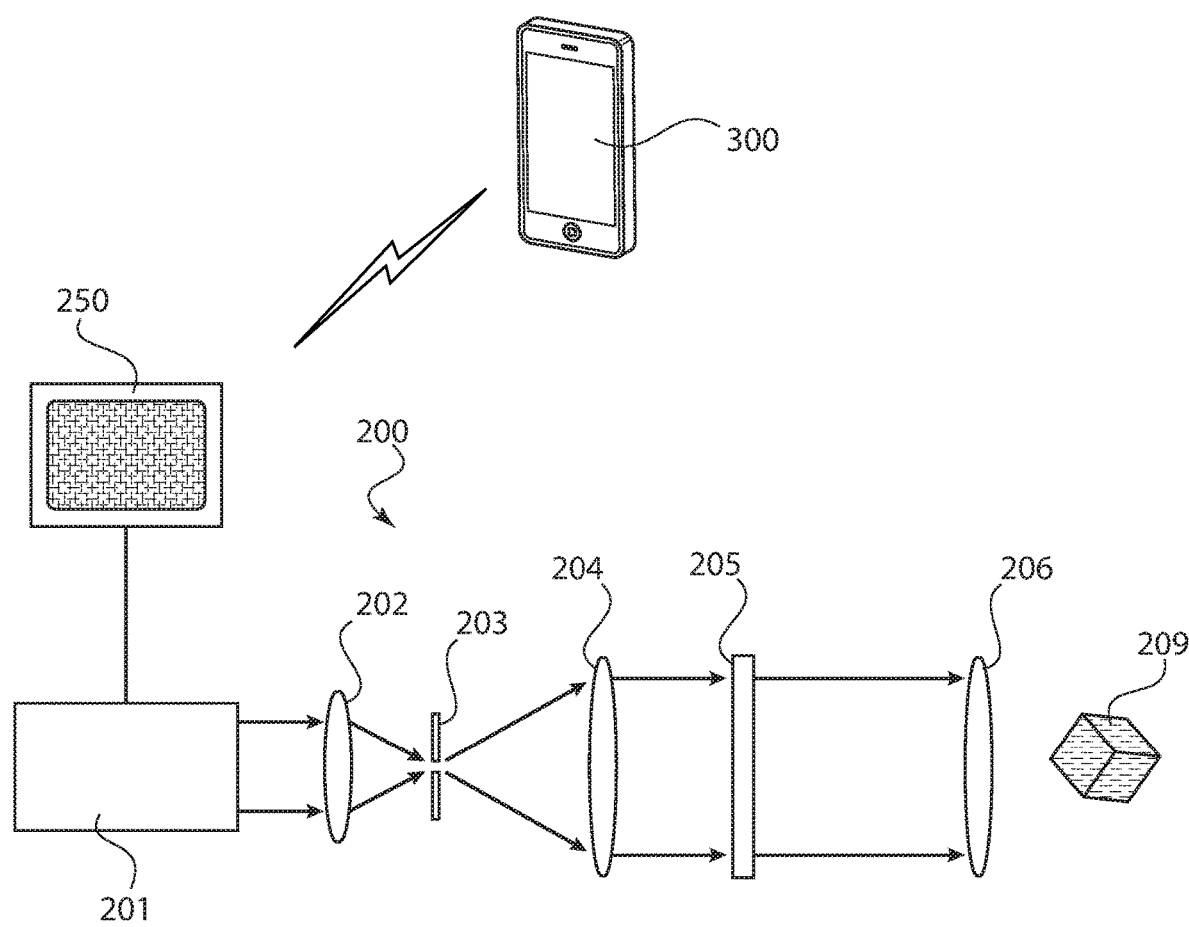
FIG. 4 shows an embodiment employing a holographic projector as the display.

A software application loaded onto mobile telephone creates the user interface 17 that allows the user view and control the programming associated with the application, as shown in FIG. 4.

Figure 3:
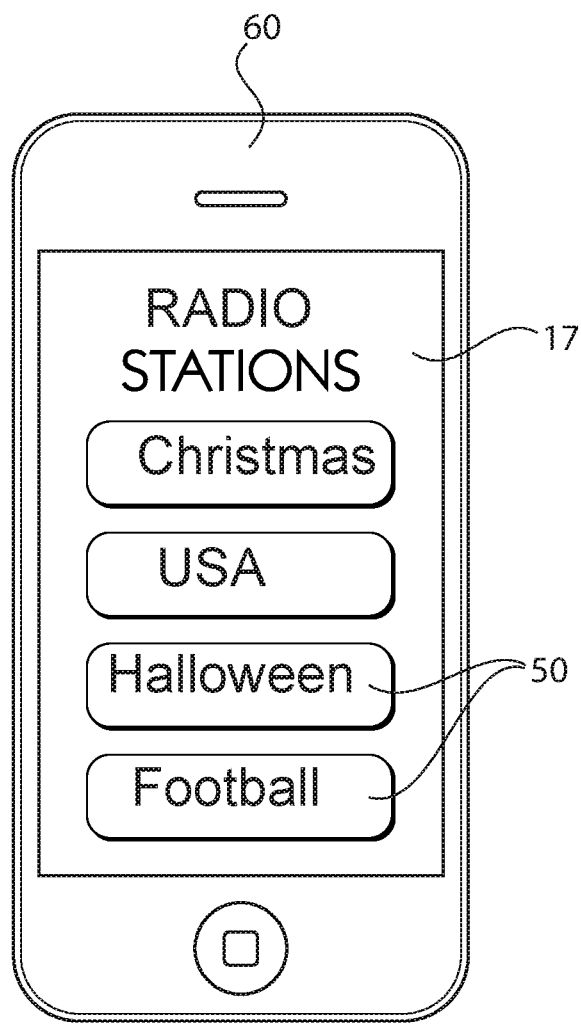
FIG. 3 shows the user interface displaying the various options for radio stations for a speaker.

As shown in FIG. 3, the software could offer a selection of different themed programming as displayed on a display 17 of smartphone 60. The user can pick one of the icons 50 for play through speaker 32. This sends the desired programming through the audio speaker 32 as well as programs the display, such as display 29 in FIG. 2, or a holographic projector 200, as shown in FIG. 5.

As shown in FIG. 4, holographic projector 200 is connected with a speaker 250 to form the themed ornament according to the invention. Speaker 250 is wirelessly connected to a microprocessor contained in a mobile telephone 300. Mobile telephone 300 contains a receiver which receives audio signals from the internet and transmits them to the speaker. In addition, the receiver also receives still images or video data from the internet and transmits them to holographic projector 200. The microprocesser controls the transmission so that images or videos are always correlated with the audio content selected. This way, the images projected by projector 200 correspond to the audio signals being played by speaker 250. In some instances a video with accompanying sound can play via the speaker and projector. In other instances, the video or still images transmitted are representative of a general theme of the audio signals. For example the system can play a music video through both the projector and speakers. Or, the speakers can play Christmas music and the projector can transmit an image of a Christmas tree, as shown in FIG. 5. The microprocessor combines the video and audio data together if the two are not already combined in a single streaming transmission from the internet, so that video and audio are transmitted simultaneously to the projector and speaker. The user can change the programming by installing additional applications on the processor, so that the preselected stations are not permanent, and the transmissions can change over time, based on the user's preferences.

Projector 200 can be any type of holographic projector that is configured to project 2D or 3D images into a space. Projector 200 can consist of a light source 201, an object lens 202, a spacial filter 203, a collimating lens 204, a light modulator 205 and an optical lens 206. These elements can produce a high quality 3D holographic image 209.

The projector 200 can be set up so that it projects the image onto the speaker to transform the appearance of the speaker into the projected image, as shown in FIG. 5, where projector 200 projects an image of a Christmas tree onto the speaker, so that it appears as if the tree itself were playing the audio programming. Alternatively, the projector 200 can be arranged so that it projects directly from the speaker, to obscure the visibility of the speaker with the hologram. Either way, it looks like the sound is emanating directly from the hologram.

The various embodiments and aspects of the invention described here can be employed individually or in conjunction with other embodiments and aspects. Descriptions of individual aspects and embodiments does not preclude the inclusion of other aspects, embodiments or additional structural components.

It is to be understood that the invention is not limited to the details of construction or process steps set forth in the following description. The invention is capable of other embodiments and of being practiced or being carried out in various ways.

While there have been shown, described and pointed out fundamental novel features of the invention as applied to preferred embodiments or aspects thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A system for playing signals received from the internet or other information highway, comprising:
   an audio device comprising:
   a receiver that connects to the internet or other information highway or to a database having a stored playlist; and
   a processor in the receiver that is programmed to connect to preselected addresses on the internet or other information highway or to the stored playlist;
   a user interface that is configured for allowing a user to control processes of the processor and change the preselected addresses to which the processor connects;
and
   a least one speaker configured for connecting to the receiver, the speaker being adapted to play signals received by the receiver,
   a holographic projector connected to the receiver, that is adapted to project a 3D holographic image that is received by the receiver,
      wherein the holographic projector is configured to project a 3D holographic image from the speaker or onto the speaker, so that the speaker takes on the appearance of the holographic image; and
   wherein the processor is programmed to correlate the images displayed by the holographic projector with a theme of the signals played by the at least one speaker.

2. The system of claim 1, wherein the receiver wirelessly connects to the internet or other information highway or to the database.

3. The system of claim 1, wherein the receiver wirelessly connects to the speaker and holographic projector.

4. The system of claim 1, wherein the processor is device is contained in a smartphone.

* * * * *